US012790837B2

(12) United States Patent
Hendryx

(10) Patent No.: US 12,790,837 B2
(45) Date of Patent: Nov. 10, 2026

(54) BATTERY PACK-POWERED SCREED

(71) Applicant: MILWAUKEE ELECTRIC TOOL CORPORATION, Brookfield, WI (US)

(72) Inventor: Caleb Hendryx, Waukesha, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 974 days.

(21) Appl. No.: 18/153,430

(22) Filed: Jan. 12, 2023

(65) Prior Publication Data

US 2023/0228106 A1 Jul. 20, 2023

Related U.S. Application Data

(60) Provisional application No. 63/299,666, filed on Jan. 14, 2022, provisional application No. 63/328,074, filed on Apr. 6, 2022.

(51) Int. Cl.
*E04F 21/24* (2006.01)

(52) U.S. Cl.
CPC ...... *E04F 21/242* (2013.01); *B25D 2250/095* (2013.01); *B25D 2250/201* (2013.01); *B25D 2250/265* (2013.01)

(58) Field of Classification Search
CPC .............. E04F 21/242; B25F 2250/095; B25F 2250/201; B25F 2250/265
USPC ........................................ 404/84.1, 112, 114
See application file for complete search history.

(56) References Cited

U.S. PATENT DOCUMENTS

| | | | |
|---|---|---|---|
| 2,008,296 | A | 7/1935 | Soldan |
| 2,178,881 | A | 11/1939 | Roeth |
| 2,400,341 | A | 5/1946 | Day et al. |
| 2,411,317 | A | 11/1946 | Day et al. |
| 2,501,158 | A | 3/1950 | Chilcott |
| 2,808,238 | A | 10/1957 | Spitler |
| 3,410,528 | A | 11/1968 | Clark et al. |
| 3,522,740 | A | 8/1970 | Hynes et al. |
| 3,792,617 | A | 2/1974 | Strasser et al. |
| 4,343,568 | A | 8/1982 | Kaltenegger |
| 4,832,525 | A | 5/1989 | Morrison et al. |
| 5,984,571 | A | 11/1999 | Owens |
| 6,231,331 | B1 | 5/2001 | Lievers |

(Continued)

FOREIGN PATENT DOCUMENTS

| | | | | |
|---|---|---|---|---|
| KR | 200237678 Y1 | 10/2001 | | |
| WO | WO-0047822 A1 * | 8/2000 | ............. | E01C 19/48 |

OTHER PUBLICATIONS

MBW, Inc., "ScreeDemon," Operator's Safety and Service Manual, © Dec. 2003 (21 pages).

*Primary Examiner* — Gary S Hartmann

(74) *Attorney, Agent, or Firm* — Michael Best & Friedrich LLP

(57) ABSTRACT

Systems and methods of controlling a vibrating screed. One vibrating screed includes a screed member, a motor configured to vibrate the screed member, and a speed sensor configured to output speed signals indicative of a motor speed. A controller is connected to the speed sensor and the motor. The controller is configured to drive the motor according to a speed command, receive the speed signals from the speed sensor, determine whether the motor speed is less than or equal to a speed threshold, and terminate, in response to the motor speed being less than or equal to the speed threshold, operation of the motor.

12 Claims, 11 Drawing Sheets

(56) References Cited

U.S. PATENT DOCUMENTS

| | | | | |
|---|---|---|---|---|
| 6,296,467 | B1 | 10/2001 | Rouillard | |
| 6,988,851 | B2 | 1/2006 | Sina | |
| 7,175,365 | B1 | 2/2007 | Breeding | |
| 7,201,537 | B2 | 4/2007 | Sina | |
| 7,204,659 | B2 | 4/2007 | Schmitt et al. | |
| 7,320,558 | B2 | 1/2008 | Quenzi et al. | |
| 7,381,009 | B2 * | 6/2008 | Jenkins | F16D 48/06 404/112 |
| 7,549,822 | B2 | 6/2009 | Rouillard | |
| 7,572,082 | B2 | 8/2009 | Rouillard | |
| 7,690,864 | B2 * | 4/2010 | Allen | E04F 21/247 404/112 |
| 8,360,680 | B2 * | 1/2013 | Allen | E04F 21/247 404/112 |
| 8,388,264 | B2 * | 3/2013 | Grahl | E04F 21/245 404/112 |
| 8,636,442 | B1 * | 1/2014 | Sopko, Jr. | E01C 19/48 701/50 |
| 9,382,675 | B2 * | 7/2016 | Frelich | E01C 19/4853 |
| 9,835,610 | B2 * | 12/2017 | Kangas | E01C 19/42 |
| 10,889,943 | B2 * | 1/2021 | Goutermont | E01C 23/00 |
| 12,084,873 | B2 * | 9/2024 | Reiter | E01C 19/38 |
| 12,247,361 | B2 | 3/2025 | Baratta | |
| 2017/0218576 | A1 | 8/2017 | Lindley et al. | |
| 2019/0006980 | A1 | 1/2019 | Sheeks et al. | |
| 2020/0076337 | A1 * | 3/2020 | Abbott | H01M 10/425 |
| 2024/0410186 | A1 * | 12/2024 | Reiter | E01C 19/40 |

* cited by examiner

BATTERY PACK-POWERED SCREED

RELATED APPLICATIONS

This application claims the benefit of U.S. Provisional Patent Application No. 63/299,666, filed Jan. 14, 2022, and claims the benefit of U.S. Provisional Patent Application No. 63/328,074, filed Apr. 6, 2022, the entire content of each of which is hereby incorporated by reference.

FIELD

Embodiments described herein provide systems and methods for operating a screed.

SUMMARY

Vibrating screeds described herein include a screed member, a motor configured to vibrate the screed member, and a speed sensor configured to output speed signals indicative of a motor speed. A controller is connected to the speed sensor and the motor. The controller is configured to drive the motor according to a speed command. The controller is configured to receive the speed signals from the speed sensor and determine whether the motor speed is less than or equal to a speed threshold. In response to the motor speed being less than or equal to the speed threshold, the controller is configured to terminate operation of the motor.

In some aspects, the controller is further configured to drive, in response to the motor speed being greater than or equal to the speed threshold, the motor according to the speed command.

In some aspects, the vibrating screeds further include a trigger, and wherein the speed command is associated with actuation of the trigger.

In some aspects, the controller is further configured to brake, in response to the motor speed being less than the speed threshold, the motor to a stop, and place the vibrating screed in a locked state.

In some aspects, the controller is further configured to receive a restart signal, and permit, in response to the restart signal, operation of the motor.

In some aspects, the controller is further configured to determine whether the motor speed is less that the speed threshold for a predetermined period of time, and terminate, in response to the motor speed being less than the speed threshold for the predetermined period of time, operation of the motor.

In some aspects, the vibrating screeds further include an exciter assembly configured to vibrate the screed member in response to being driven by the motor.

In some aspects, the vibrating screeds further include a battery pack interface configured to receive a battery pack, and wherein the battery pack is configured to provide power to the motor.

Vibrating screeds described herein include a screed member, a motor configured to vibrate the screed member, a sensor configured to output signals indicative of an operating characteristic of the motor, and a current sensor configured to output signals indicative of a motor current A controller is connected to the sensor, the current sensor, and the motor. The controller is configured to receive signals from the sensor and drive the motor based on the signals from the sensor. The controller is configured to receive current signals from the current sensor and determine whether the motor current is greater than or equal to a current threshold. In response to the motor current being greater than or equal to the current threshold, the controller is configured to drive the motor based on the current signals from the current sensor.

In some aspects, the sensor is a speed sensor configured to output speed signals indicative of a motor speed.

In some aspects, the sensor is a voltage sensor configured to output voltage signals indicative of a motor voltage.

In some aspects, the controller is configured to determine whether the motor current has decreased below the current threshold, and drive, in response to the motor current decreasing below the current threshold, the motor based on the signals from the sensor.

In some aspects, the vibrating screeds further include a battery pack interface configured to receive a battery pack, and wherein the battery pack is configured to provide power to the motor.

In some aspects, the controller is further configured to reduce, in response to the motor current being greater than or equal to the current threshold, a maximum speed of the motor.

Methods described herein for operating a vibrating screed include receiving first signals from a first sensor, the first signals indicative of an operating characteristic of a motor, and driving the motor based on the first signals from the first sensor. The method also includes receiving current signals from a current sensor, the current signals indicative of a motor current, and determining whether the motor current is greater than or equal to a current threshold. In response to the motor current being greater than or equal to the current threshold, the method includes driving the motor based on the current signals from the current sensor.

In some aspects, the first sensor is a speed sensor configured to output speed signals indicative of a motor speed.

In some aspects, the first sensor is a voltage sensor configured to output voltage signals indicative of a motor voltage.

In some aspects, the methods further include determining whether the motor current has decreased below the current threshold, and driving, in response to the motor current decreasing below the current threshold, the motor based on the first signals from the first sensor.

In some aspects, the methods further include reducing, in response to the motor current being greater than or equal to the current threshold, a maximum speed of the motor.

In some aspects, driving the motor includes providing, via an inverter, power from a battery pack to the motor.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1A:
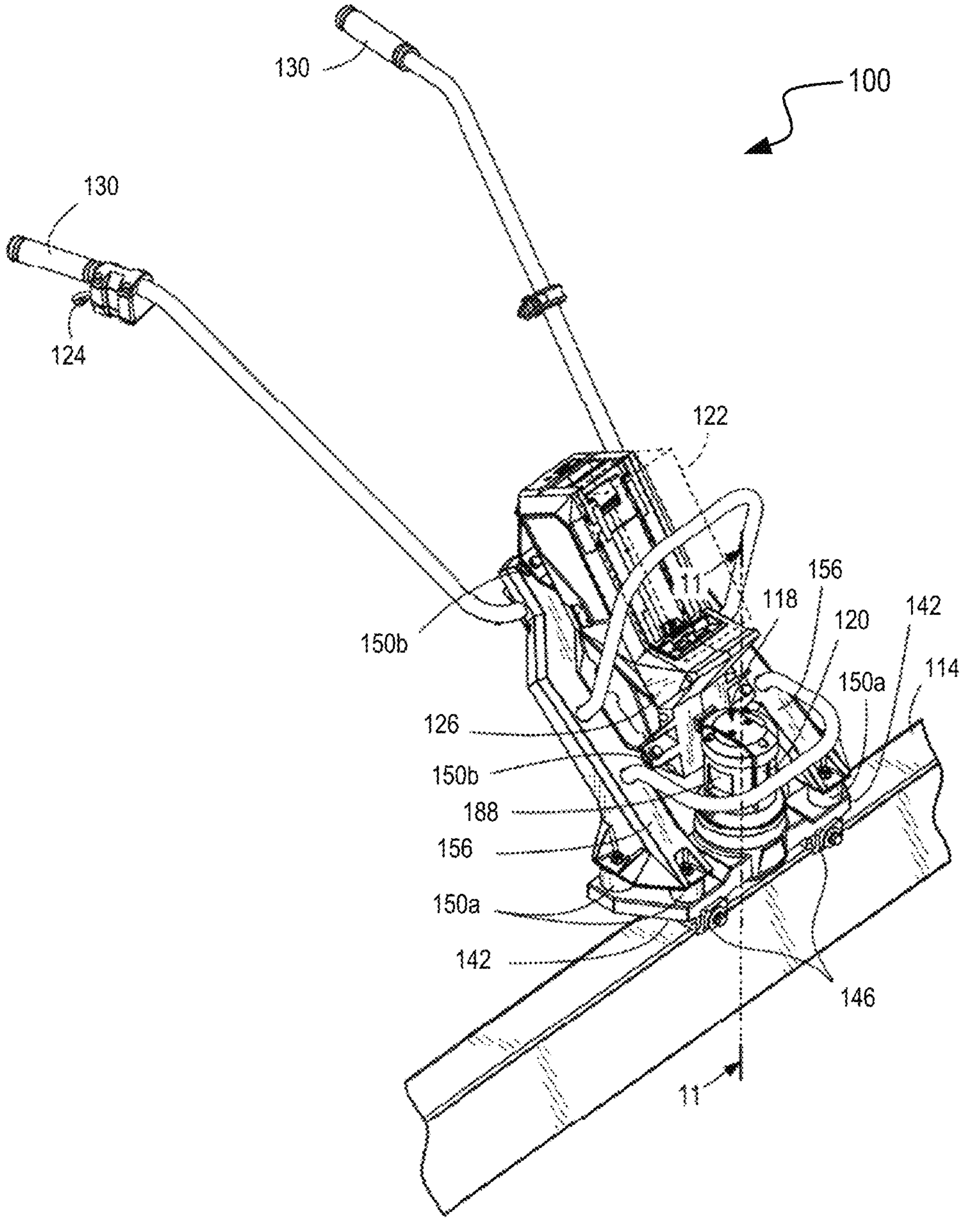
FIGS. 1A and 1B illustrate a battery-pack powered screed, according to embodiments described herein.
Figure 1B:
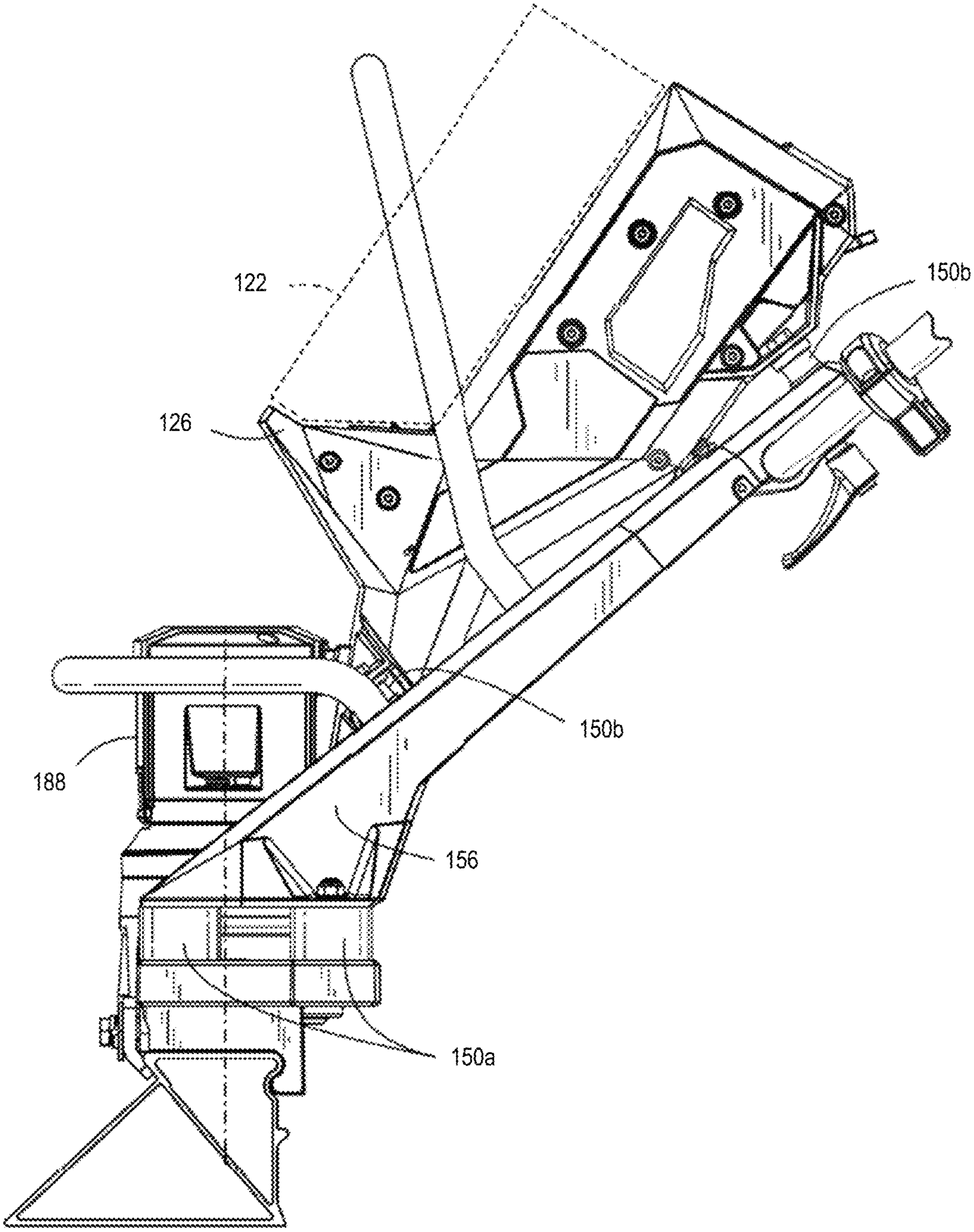

FIGS. 1A and 1B illustrate a vibrating screed 100 according to some embodiments. As shown in FIG. 1A, the vibrating screed 100 includes a screed blade 114 (e.g., screed member) for smoothing and leveling a viscous material, such as concrete. The vibrating screed 100 also includes a brushless DC (BLDC) electric motor 118 within a motor housing 120, a battery pack 122 for powering the motor 118, and a housing 126 within which control electronics associated with the motor 118 are located and upon which the battery pack 122 is supported. The motor 118 includes a rotor and a stator. The screed 100 also includes a pair of handles 130 extending from a frame 156 that are grasped by a user for maneuvering the screed 100 around a work site.

The motor 118 is configured to drive an exciter assembly including an exciter housing. The exciter housing includes a pair of wings 142 extending parallel with the screed blade 114. Each wing 142 includes a clamp 146 fastened thereto to clamp onto the screed blade 114 and secure the screed blade 114 to the exciter housing. In some embodiments, the clamp 146 may be configured as a quick release mechanism including, for example, an over-center cam latch. Each of the clamps 146 includes an edge clamp, which is fastened to an associated wing 142, and a compatible interface, which is integrally formed with the associated wing 142 of the exciter housing. The interface is shaped to be compatible with various screed blades 114. The clamp 146 may be another mechanism operable to secure the screed blade 114 to the wing 142. When the motor 118 drives the exciter assembly, the exciter assembly vibrates the screed blade 114.

As shown in FIGS. 1A and 1B, to attenuate vibration transmitted to the operator, the control electronics within the housing 126, and the battery pack 122, vibration dampers 150*a* (e.g., visco-elastic bushings or a spring-damper unit) are arranged between each of the wings 142 and the frame 156. Additionally, vibration dampers 150*b* (e.g., visco-elastic bushings or a spring-damper unit) are arranged between the frame 156 and the housing 126. In the illustrated embodiment of the vibrating screed 100, four vibration dampers 150*a* are cylindrically shaped and are provided in a rectangular array (as viewed from above) between the frame 156 and the exciter housing. And, in the illustrated embodiment of the vibrating screed 100, four vibration dampers 150*b* are cylindrically shaped and are provided in a rectangular array (as viewed in a direction perpendicular to the frame 156) between the frame 156 and the housing 126. The vibration dampers 150*a*, 150*b* are also symmetrically located relative to a vertical plane (co-planar with section 11-11 in FIG. 1A) bisecting the housing 126 and the motor 118. A motor cap 188 is arranged on the motor housing 120 and covers a driveshaft by extending over a neck of the exciter housing. When a trigger 124 is depressed, electrical current is supplied from the battery pack 122 to the motor 118.

Figure 2B:
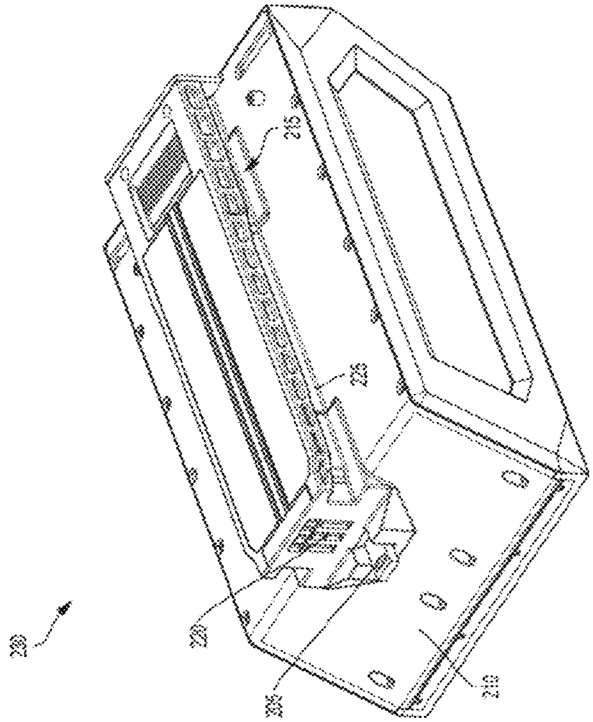
FIGS. 2A and 2B illustrate different sizes of battery packs for powering the screed of FIGS. 1A and 1B, according to embodiments described herein.
Figure 2A:
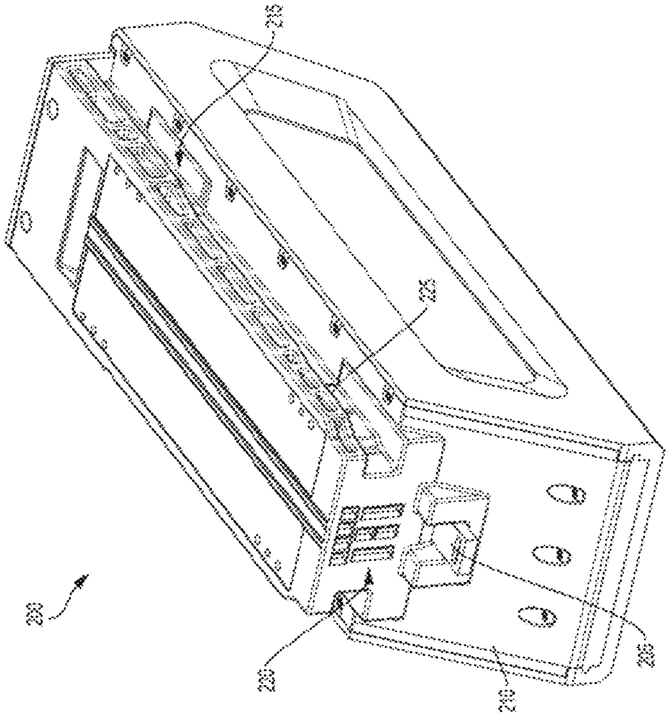

FIGS. 2A-2B illustrate example battery packs that are detachable to the vibrating screed 100. The battery pack may include one or more cell strings, each having a number (e.g., 10) of battery cells connected in series to provide a desired discharge output (e.g., nominal voltage [e.g., 20 V, 40 V, 60 V, 80 V, 120 V] and current capacity). Accordingly, the battery pack may include "20S1P," "20S2P," etc., configurations. In other embodiments, other combinations of battery cells are also possible.

Each battery cell may have a nominal voltage between 3 V and 5 V and may have a nominal capacity between 3 Ampere-hours (Ah) and 5 Ah. In some embodiments, each battery cell has a diameter of up to about 21 mm and a length of up to about 71 mm. The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

The screed 100 is capable to run using various battery sizes and power sources, some of which are described below. In some embodiments, the screed uses a 216 Watt-hour ("Wh") battery pack. In other embodiments, the screed uses a 420 Wh battery pack. In yet another embodiment, the screed uses a 630 Wh battery pack or a 1000 Wh battery pack. In some embodiments, the battery pack is between about a 200 Wh battery pack and a 1000 Wh battery pack. In other embodiments, the screed 100 is compatible with a wall adapter. The wall adapter fits into a battery location located on the screed 100, then may be plugged into the wall to allow the screed 100 to be run off of DC power from the AC/DC power adapter.

In some embodiments, the screed 100 uses a battery pack having a power rating below 200 Wh. For example, a 27 Wh battery pack (e.g., 18V nominal voltage and a 1.5 Ah capacity) can be used to power the screed 100. In some embodiments, a 90 Wh battery pack (e.g., 18V nominal voltage and a 5 Ah capacity) can be used to power the screed 100. In some embodiments, a battery pack between 25 Wh and 270 Wh can be used to power the screed 100. In some embodiments, a plurality of battery packs are used to power the screed 100. For example, two to four battery packs (e.g., 18V nominal voltage and capacities between 1.5 Ah and 15 Ah) can be connected in series, parallel or a series-parallel combination to provide between, for example, 27 Wh and 1080 Wh of power to the screed 100.

A battery pack 200 having a 20S1P configuration is illustrated in FIG. 2A in accordance with some embodiments. The battery pack 200 includes a battery pack housing 210 with a support portion 215 and a battery terminal block 220. The battery pack housing 210 encloses components of the battery pack 200 including the battery cells, a battery controller, etc. The support portion 215 provides a slide-on arrangement with a projection/recess 225 cooperating with a complementary projection/recess 225 of the combination.

The battery pack 200 defines a length within a range of approximately 260 mm to approximately 280 mm. In some embodiments, the length is approximately 270 mm. In some embodiments, the length is approximately 270 mm. The battery pack 200 defines a width of the battery pack 200 within a range of approximately 90 mm to approximately 110 mm. In some embodiments, the width is approximately 100 mm. The battery pack 200 defines a height of the battery pack 200 with a range of 96 mm to approximately 116 mm. In some embodiments, the height of the battery pack 200 is approximately 106 mm. The total weight of the battery pack 200 is within a range of approximately 5.5 lbs. to 6.5 lbs. In some embodiments, the total weight of the battery pack 200 is approximately 6 lbs.

The battery pack 200 has an AC internal resistance ("ACIR") within a range of approximately 150 mΩ to approximately 160 mΩ. The battery pack 200 has a DC internal resistance within a range of approximately 220 mΩ to approximately 260 mΩ.

FIG. 2B illustrates another embodiment of a battery pack 230 that is detachable to the vibrating screed 100. The battery pack 230 having a 20S2P configuration is illustrated in accordance with some embodiments. The battery pack 230 includes two cell strings of twenty series connected cells, the cell strings being connected in parallel. The battery pack 230 defines a length within a range of approximately 260 mm to approximately 280 mm. In some embodiments, the length of the battery pack 230 is approximately 270 mm. The battery pack defines a width within a range of approximately 171 mm to approximately 191 mm. In some embodiments, the width of the battery pack 230 is approximately 181 mm. The battery pack 230 defines a height within a range of approximately 96 mm to approximately 116 mm. In some embodiments, the height of the battery pack 230 is approximately 106 mm. The total weight of the battery pack 230 is within a range of approximately 10.25 lbs. to 11.25 lbs. In some embodiments, the total weight of the battery pack 230 is approximately 10.75 lbs. In some embodiments a 20S3P battery pack is detachable to the vibrating screed 100.

The battery pack 230 has an AC internal resistance ("ACIR") within a range of approximately 75 mΩ to approximately 80 mΩ. The battery pack 230 has a DC internal resistance within a range of approximately 130 mΩ to approximately 170 mΩ.

The battery packs 200, 230 of FIG. 2A and FIG. 2B include a switch 205 extending from the battery pack housing 210. The switch 205 is configured to be in a first position and a second position. When in the first (e.g., "OFF") position, electrical components (for example, the subcores) of the battery packs 200, 230 contained within the battery pack housing 210 are electrically disconnected from each other. When in the second (e.g., "ON") position, electrical components (e.g., battery cell subcores) are electrically connected to each other. The switch 205 may be manipulated by a user from the first position to a second position by pressing or sliding the switch 205.

Figure 3:
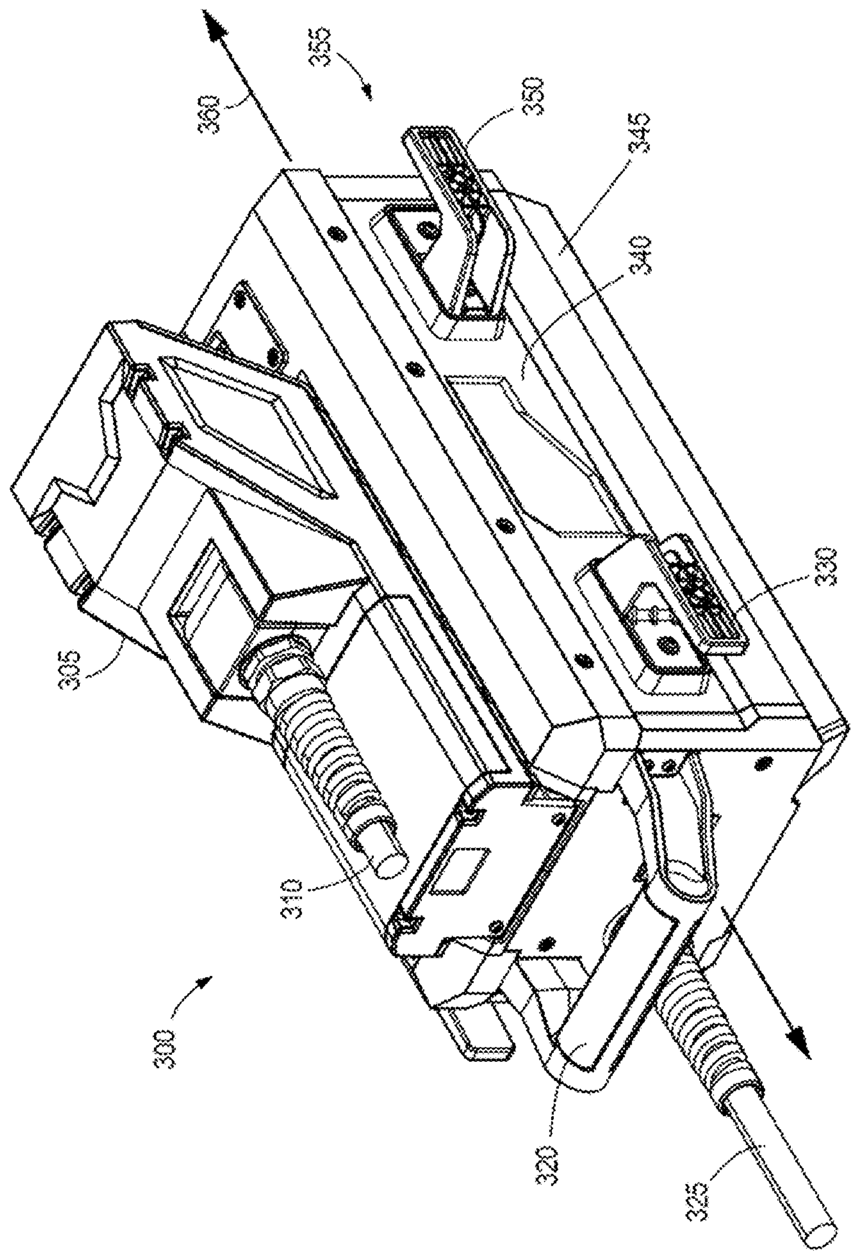
FIG. 3 illustrates an adapter including an AC/DC adapter assembly with a power box, according to embodiments described herein.

The screed 100 may also be configured to receive a power adapter 305. FIG. 3 illustrates the power adapter 305 is an AC/DC power adapter assembly 300 including a power box 340 is operable to receive an input alternating current (AC) power via a power cord and supply direct current (DC) power via an adapter 305 to the screed 100. An adapter cord 310 electrically connects the adapter 305 to the power box 340. In other constructions, the power adapter assembly 300 may receive power from another power source (e.g., a DC power source [a battery pack], a generator, etc.).

The power box 340 includes a housing 345 formed, in the illustrated construction, of two clamshell housing halves connected along plane 360. The in illustrated construction, the housing halves are connected with threaded fasteners (e.g., screws) or other suitable coupling means. Together, the housing halves define an internal compartment within the housing 345 containing internal components of the power box 340.

The housing 345 includes a handle 320 formed at a first end opposite a second end and a storage portion operable to selectively receive the power adapter 305 for convenient storage when the power adapter 305 is not in use. In additional or alternative embodiments, the storage portion may be configured to receive the pack engagement portion to selectively couple the battery pack 200, 230 to the power box 340. The storage portion is formed in a first or top side of the power box 340. The storage portion includes a recessed cavity open at an open end proximate the first end and adjacent the handle 320, and closed at a closed end.

The illustrated power box 340 includes a cord wrap arrangement operable to selectively receive a wound cord (e.g., the power cord 325 and/or the adapter cord 310) for compact and convenient storage when the power adapter 305 is not in use. In the illustrated construction, a pair of cord wraps are provided on opposite sides of the housing 345. In the illustrated construction, each cord wrap 355 includes a pair of longitudinally opposed hooks 330, 350 projecting laterally outwardly from the housing 345. That is, in the illustrated construction, a first cord wrap is configured to receive the power cord 325 in a wound configuration. In other constructions, the power box 340 may include a single cord wrap 355 (large enough to receive the provided cords [e.g., the power cord 325 and the adapter cord) 310]) or more than two cord wraps 355.

The power adapter cord 310 has a length (e.g., at least about 2 meters [m]) and a diameter (e.g., about 10 mm to about 13 mm). In the illustrated construction, the cord length allows a user to operate the portable adapter 305 at or near an eye level while the power box 340 is resting at or near ground level, which limits excess adapter cord 310 that can be cumbersome during use. In other constructions, the cord length can be less than or greater than 3 meters so as to be adapted to particular uses of the portable adapter 305.

The power box 340 has at least one foot that projects downwardly from the housing 345 and that is engageable with a support surface. In the illustrated construction, the power box 340 has a pair of longitudinally-extending feet at opposite sides of the housing 345. In particular, each of the feet is coupled to a second or bottom side of the housing 345 and has a first surface that is substantially perpendicular to the second side of the power box 340 and a second surface that is oriented at an angle $\alpha$ relative to the second side of the power box 340. Each of the feet has a polygonal cross-section. In other or additional constructions, the power box 340 may have four separate feet positioned proximate the corners. In still other constructions, the power box 340 has feet having any suitable location and configuration. The feet provide the power box 340 with a stable and robust resting surface when the power box 340 is supported on the floor or the ground. For example, the feet allow the power box 340 to straddle obstacles or otherwise address uneven ground surfaces. The feet also raise the housing 345 to a certain height above the ground, thereby preventing or inhibiting contaminants (e.g., pooled liquids, dust, other debris, etc.) from entering the housing 345 and interfering with the internal components of the power box 340. In the illustrated construction, the height is approximately 30 mm, but may range from 20 mm to 40 mm.

The power adapter assembly 300 includes a circuit operable, in the illustrated construction, to receive as input AC power and to output DC power. The circuit includes the necessary electrical components to operate as an AC/DC adapter (e.g., a rectifier). The circuit may include other components (e.g., a battery charging circuit portion to charge a connected battery pack, a pass-through circuit portion to output AC power to an AC outlet, an output circuit portion to output DC power to a DC power outlet, etc.). The circuit further includes a Ground Fault Circuit Interrupt ("GFCI") protection system to protect against electrical shock during operation. GFCI controls are located on the housing 345 adjacent the storage portion.

Figure 4A:
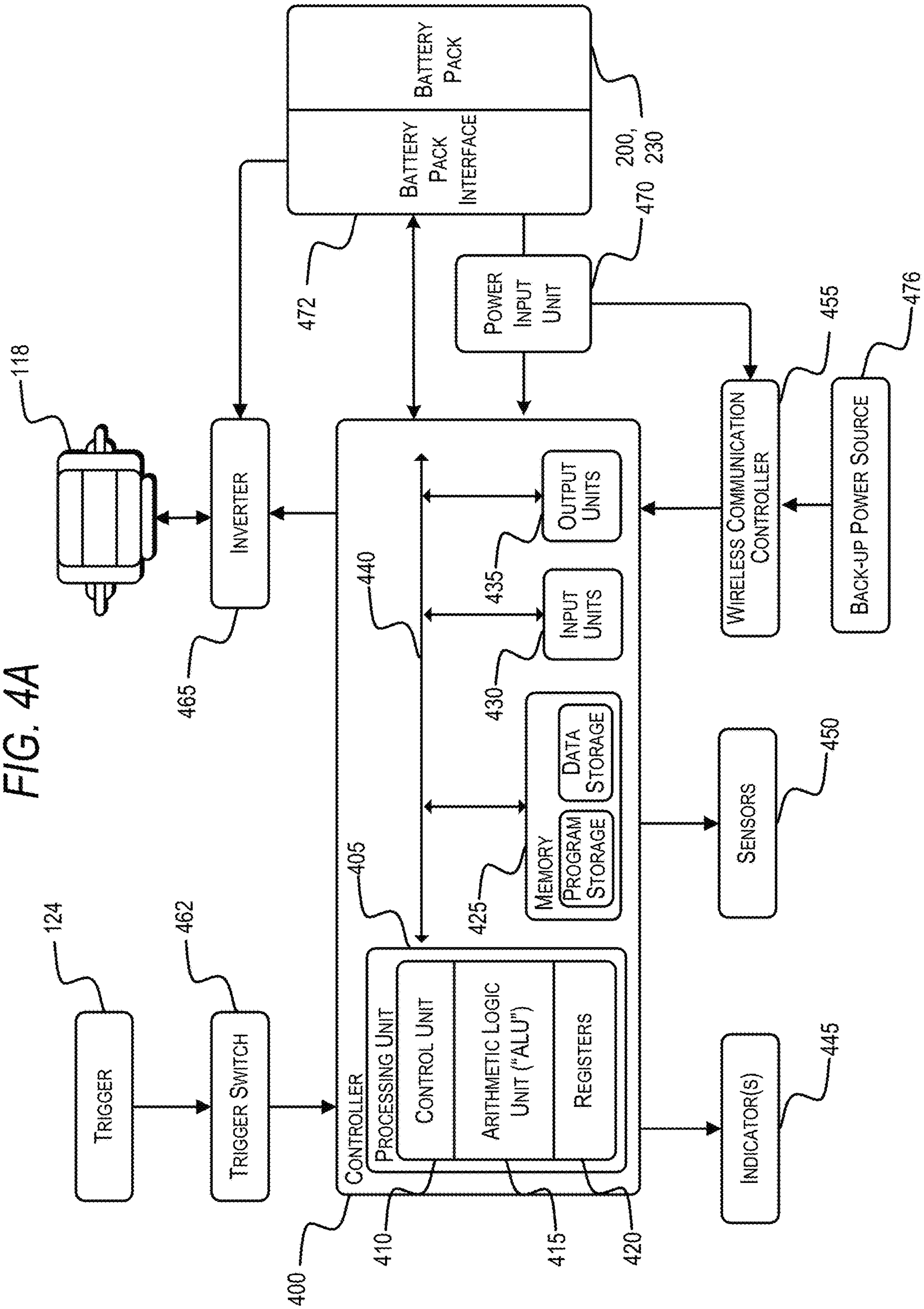
FIG. 4A illustrates a controller for the screed of FIGS. 1A and 1B, according to embodiments described herein.

FIG. 4A illustrates a controller 400 for the screed 100. The controller 400 is electrically and/or communicatively connected to a variety of modules or component of the screed 100. For example, the illustrated controller 400 is connected to indicators 445, sensors 450 (which may include, for example, a pressure sensor, a speed sensor, a current sensor, a voltage sensor, a position sensor, etc.), a wireless communication controller 455, the trigger 124, a trigger switch 462, an inverter 465, a power input unit 470, and the motor 118.

The controller 400 includes a plurality of electrical and electronic components that provide power, operational control, and protection to the components and modules within the controller 400 and/or screed 100. For example, the controller 400 includes, among other things, a processing unit 405 (e.g., a microprocessor, an electronic processor, an electronic controller, a microcontroller, or another suitable programmable device), a memory 425, input units 430, and output units 435. The processing unit 405 includes, among other things, a control unit 410, an arithmetic logic unit ("ALU") 415, and a plurality of registers 420 (shown as a group of registers in FIG. 4A), and is implemented using a known computer architecture (e.g., a modified Harvard architecture, a von Neumann architecture, etc.). The processing unit 405, the memory 425, the input units 430, and the output units 435, as well as the various modules or circuits connected to the controller 400 are connected by one or more control and/or data buses (e.g., common bus 440). The control and/or data buses are shown generally in FIG. 4A for illustrative purposes. The use of one or more control and/or data buses for the interconnection between and communication among the various modules and components would be known to a person skilled in the art in view of the embodiments described herein.

The memory 425 is a non-transitory computer readable medium and includes, for example, a program storage area and data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 405 is connected to the memory 425 and executes software instruction that are capable of being stored in a RAM of the memory 425 (e.g., during execution), a ROM of the memory 425 (e.g., on a generally permanent basis), or another non-transitory computer readable medium such as another memory or a disc. Software included in the implementation of the screed 100 can be stored in the memory 425 of the controller 400. The software includes, for example, firmware, one or more applications, program data, filters, rules, one or more program modules, and other executable instructions. The controller 400 is configured to retrieve from the memory 425 and execute, among other things, instructions related to the control processes and methods described herein. In other embodiments, the controller 400 includes additional, fewer, or different components.

A battery pack interface 472 is connected to the controller 400 and couples to a battery pack 200, 230. The battery pack interface 472 includes a combination of mechanical (e.g., a battery pack receiving portion) and electrical components configured to and operable for interfacing (e.g., mechanically, electrically, and communicatively connecting) the screed 100 with a battery pack 200, 230. The battery pack interface 472 is coupled to power input unit 470. The battery pack interface 472 transmits the power received from the battery pack 200, 230 to the power input unit 470. The power input unit 470 includes active and/or passive components (e.g., voltage step-down controllers, voltage converters, rectifiers, filters, etc.) to regulate or control the power received through the battery pack interface 472, to the wireless communication controller 455, and controller 400. When the battery pack 200, 230 is not coupled to the screed 100, the wireless communication controller 455 is configured to receive power from a back-up power source 476.

The indicators 445 are also coupled to the controller 400 and receive control signals from the controller 400 to turn on and off or otherwise convey information based on different states of the screed 100. The indicators 445 include, for example, one or more light-emitting diodes (LEDs), or a display screen. The indicators 445 can be configured to display conditions of, or information associated with, the screed 100. For example, the indicators 445 can display information relating to a welding action performed by the screed 100. In addition to or in place of visual indicators, the indicators 445 may also include a speaker or a tactile feedback mechanism to convey information to a user through audible or tactile outputs.

Figure 4B:
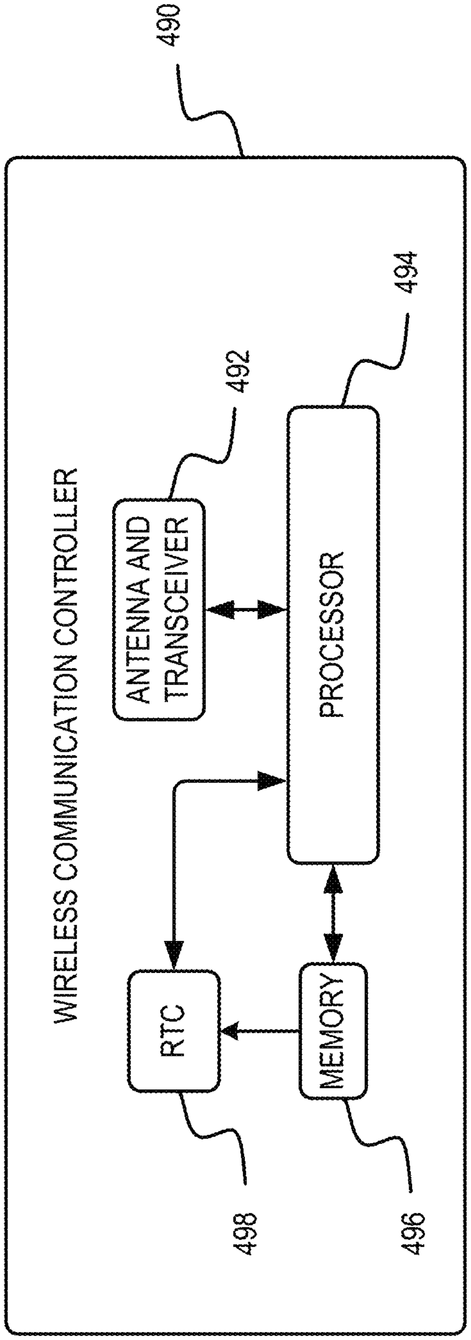
FIG. 4B illustrates a communication controller for the screed of FIGS. 1A and 1B, according to embodiments described herein.

FIG. 4B illustrates a wireless communication controller 455 for the screed 100. The wireless communication controller 455 includes a processor 494, a memory 496, an antenna and transceiver 492, and a real-time clock ("RTC") 498. The wireless communication controller 455 enables the screed 100 to communicate with an external device 482 (see, e.g., FIG. 4C). The radio antenna and transceiver 492 operate together to send and receive wireless messages to and from the external device 482 and the processor 494. The memory 496 can store instructions to be implemented by the processor 494 and/or may store data related to communications between the screed 100 and the external device 482, or the like. The processor 494 for the wireless communication controller 455 controls wireless communications between the screed 100 and the external device 482. For example, the processor 494 associated with the wireless communication controller 455 buffers incoming and/or outgoing data communicates with the controller 400, and determines the communication protocol and/or settings to use in wireless communications. The communication via the wireless communication controller 455 can be encrypted to protect the data exchanged between the screed 100 and the external device 482 from third parties.

In the illustrated embodiment, the wireless communication controller 455 is a Bluetooth® controller. The Bluetooth® controller communicates with the external device 482 employing the Bluetooth® protocol. Therefore, in the illustrated embodiment, the external device 482 and the screed 100 are within a communication range (i.e., in proximity) of each other while they exchange data. In other embodiments, the wireless communication controller 455 communicates using other protocols (e.g., Wi-Fi, ZigBee, a proprietary protocol, etc.) over different types of wireless networks. For example, the wireless communication controller 455 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, 4GSM network, a 4G LTE network, 5G New Radio, a Digital AMPS ("IS-136/TDMA") network, or an Integrated Digital Enhanced Network ("iDEN") network, etc.

The wireless communication controller 455 is configured to receive data from the controller 400 and relay the information to the external device 482 via the antenna and transceiver 492. In a similar manner, the wireless communication controller 455 is configured to receive information (e.g., configuration and programming information) from the external device 482 via the antenna and transceiver 492 and relay the information to the controller 400.

The RTC 498 increments and keeps time independently of the other power tool components. The RTC 498 receives power from the battery pack 200, 230 when the battery pack 200, 230 is connected to the screed 100, and receives power from the back-up power source 476 when the battery pack 200, 230 is not connected to the screed 100. Having the RTC 498 as an independently powered clock enables time stamping of operational data (stored in memory 496 for later export) and a security feature whereby a lockout time is set by a user (e.g., via the external device 482) and the tool is locked-out when the time of the RTC 498 exceeds the set lockout time.

Figure 4C:
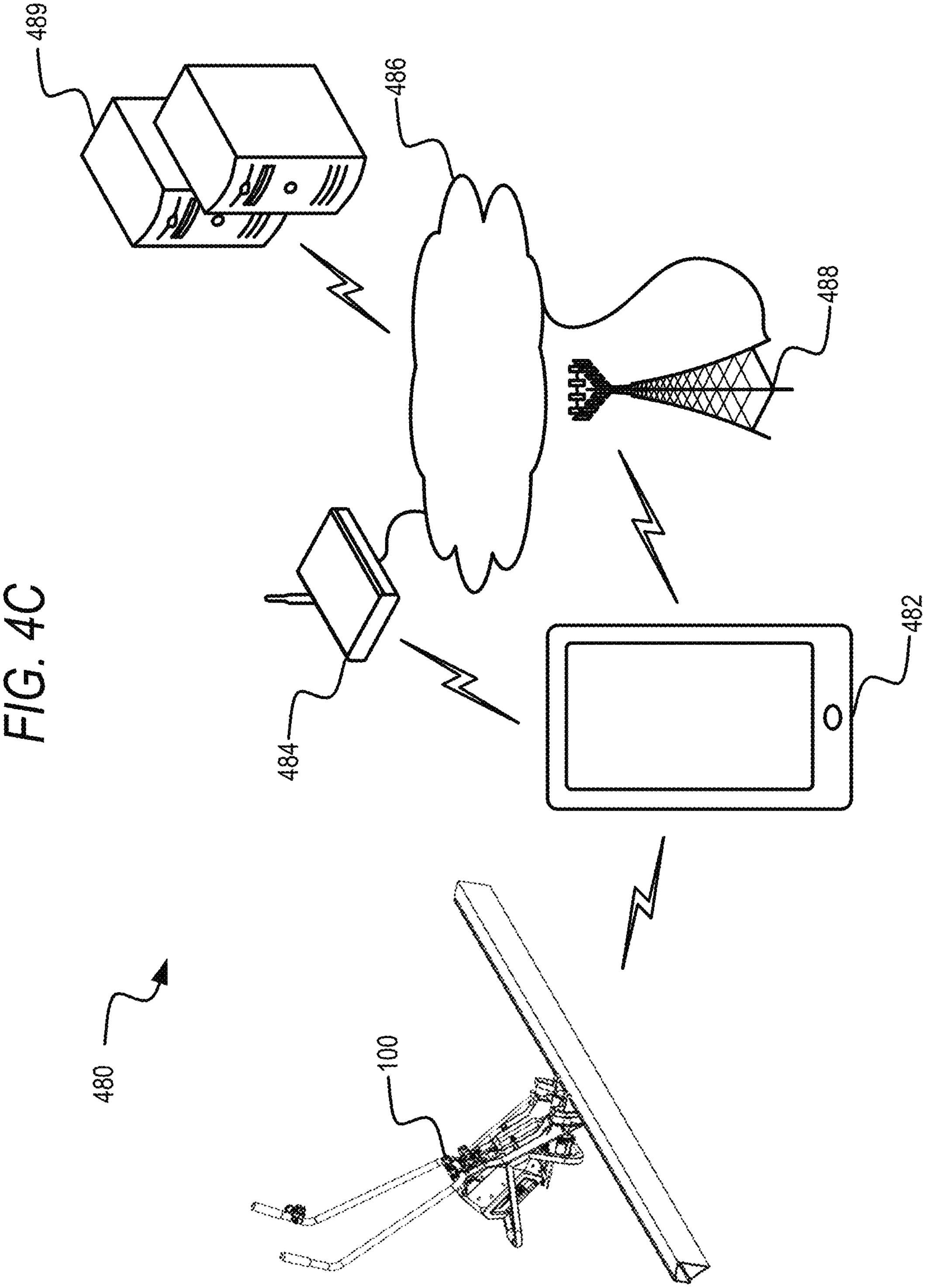
FIG. 4C illustrates a communication system for the screed of FIGS. 1A and 1B, according to embodiments described herein.

FIG. 4C illustrates a communication system 480. The communication system 480 includes at least one screed 100 and the external device 482. Each screed 100 and the external device 482 can communicate wirelessly while they are within a communication range of each other. Each screed 100 may communicate screed status, screed operation statistics, screed identification, screed sensor data, stored screed usage information, screed maintenance data, and the like.

Using the external device 482, a user can access the tool parameters for the screed 100. With the tool parameters (e.g., tool operational data), a user can determine how the tool has been used (e.g., number of tasks performed), whether maintenance is recommended or has been performed in the past, and identify malfunctioning components or other reasons for certain performance issues. The external device 482 can also transmit data to the screed 100 for tool configuration, firmware updates, or to send commands. The external device 482 also allows a user to set operational parameters, safety parameters, select tool modes, and the like for the screed 100.

The external device 482 is, for example, a smart phone (as illustrated), a laptop computer, a tablet computer, a personal digital assistant (PDA), or another electronic device capable of communication wirelessly with the screed 100 and providing a user interface. The external device 482 provides the user interface and allows a user to access and interact with the screed 100. The external device 482 can receive user inputs to determine operational parameters, enable or disable features, and the like. The user interface of the external device 482 provides an easy-to-use interface for the user to control and customize operation of the screed 100. The external device 482, therefore, grants the user access to the tool operational data of the screed 100, and provides a user interface such that the user can interact with the controller 400 of the screed 100.

In addition, as shown in FIG. 4C, the external device 482 can also share tool operational data obtained from the screed 100 with a remote server 489 connected through a network 486. The remote server 489 may be used to store the tool operational data obtained from the external device 482, provide additional functionality and service to the user, or a combination thereof. In some embodiments, storing the information on the remote server 489 allows a user to access the information from a plurality of different locations. In some embodiments, the remote server 489 collects information from various users regarding their power tool devices and provide statistics or statistical measures to the user based on information obtained from the different tools. For example, the remote server 489 may provide statistics regarding the experienced efficiency of the screed 100, typical usage of the screed 100, and other relevant characteristics and/or measures of the screed 100. The network 486 may include various networking elements (routers 484, hubs, switches, cellular towers 488, wired connections, wireless connections, etc.) for connecting to, for example, the Internet, a cellular data network, a local network, or a combination thereof as previously described. In some embodiments, the screed 100 is configured to communicate directly with the remote server 489 through an additional wireless interface or with the same wireless interface that the screed 100 uses to communicate with the external device 482.

Figure 5:
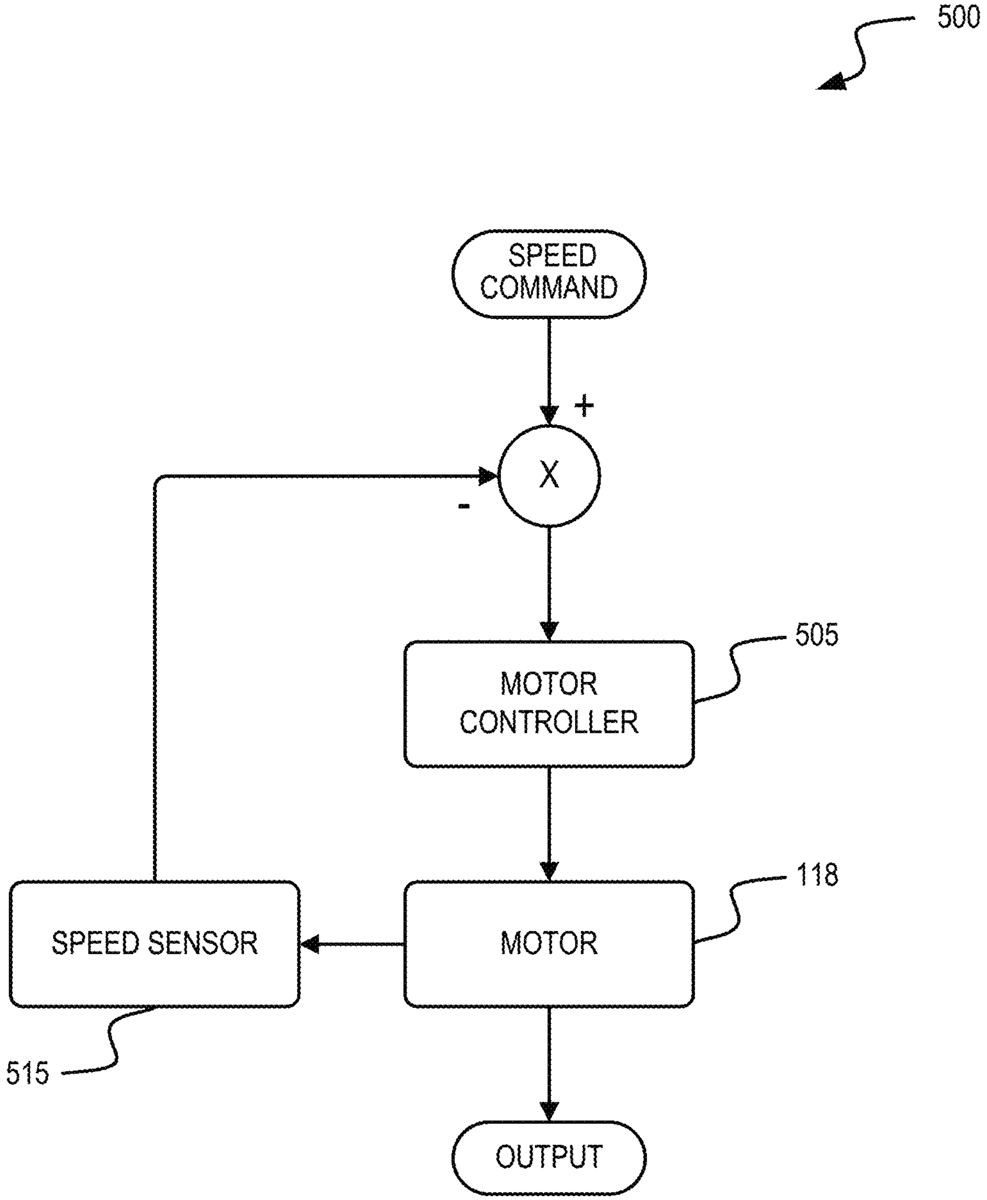
FIG. 5 illustrates a speed-based motor control system for the screed of FIGS. 1A and 1B, according to embodiments described herein.

FIG. 5 illustrates a speed-based motor control system 500 for the screed 100 of FIG. 1, according to embodiments described herein. Unlike conventional screeds equipped with an internal combustion engine, the screed 100 is powered by battery pack 200, 230 and implements, for example, a closed-loop motor control (e.g., a primary, normal, or default control mode) to regulate the motor speed to prevent, for example, the screed 100 from operating at too low of an operating speed. The speed-based motor control system 500 includes, among other things, a motor controller 505, the motor 118, and a speed sensor 515. The motor controller 505 may be, or at least function similarly to, the controller 400. The speed sensor 515 may be included in the sensors 450. The speed sensor 515 (e.g., at least one Hall effect sensor) is configured to sense a position, speed, and/or acceleration of the motor 118.

The motor controller 505 receives speed signals indicative of the motor speed from the speed sensor 515 and compares the sensed motor speed to a speed threshold (e.g., a low speed threshold value). If the motor controller 505 determines that the motor speed is below the low speed threshold value, operation of the screed 100 is stopped or terminated. In some embodiments, the speed must remain at or below the low speed threshold value for a predetermined or configurable amount of time. Speeds at or below the low speed threshold can be potentially damaging to the screed 100 or may be unsuitable for completing an operating task (e.g., leveling concrete) with the screed 100. If the screed 100 is stopped due to a low operational speed, a user can reset or restart (e.g., cycle) the screed 100 to begin using the screed 100 again.

Figure 6:
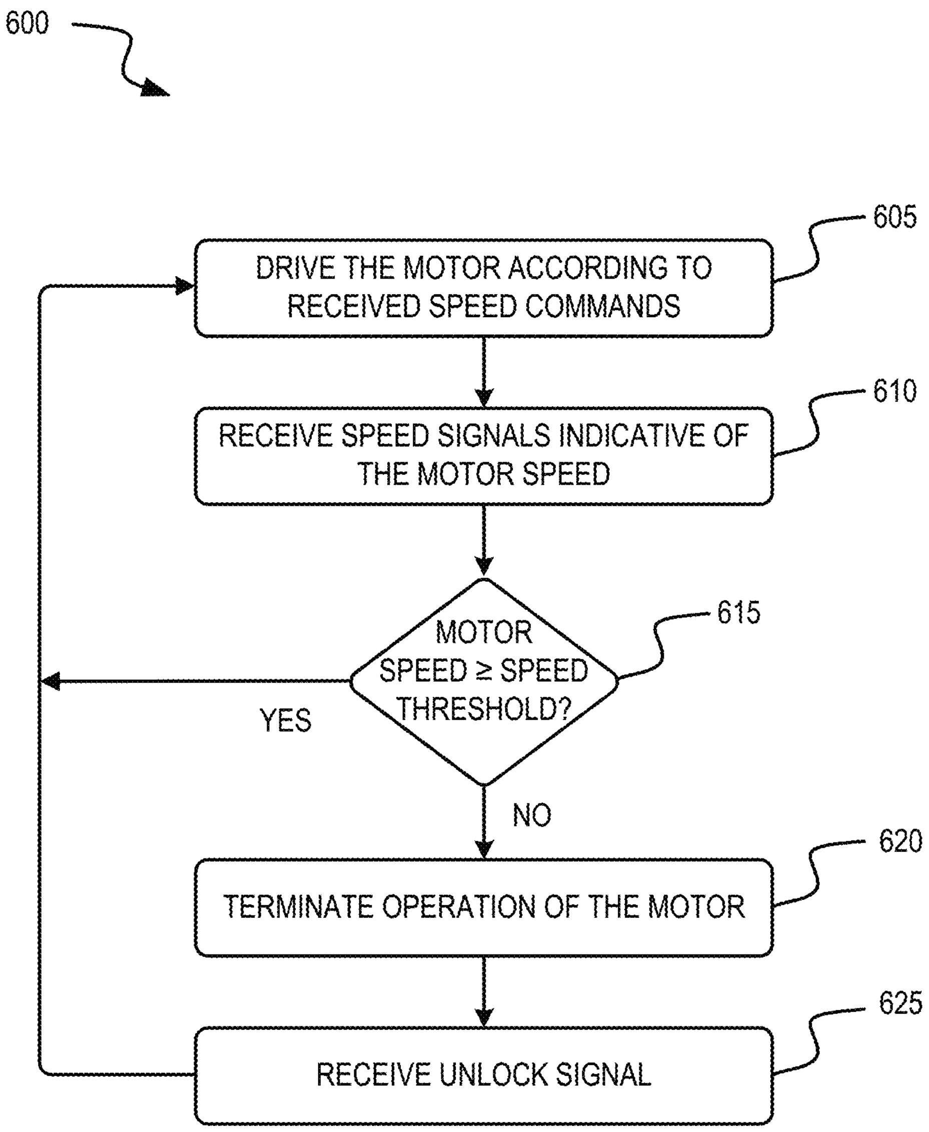
FIG. 6 illustrates a method for speed-based motor control performed by the controller of FIG. 4A, according to embodiments described herein.

FIG. 6 provides a method 600 for controlling the screed 100 based on the motor speed. The method 600 may be performed by the motor controller 505 (and, therefore, may be performed by the controller 400). At block 605, the motor controller 505 drives the motor 118 according to received speed commands. For example, the motor controller 505 detects actuation of the trigger 124. Upon detecting actuation of the trigger 124, the motor controller 505 provides power to the motor 118 via the inverter 465. At block 610, the motor controller 505 receives speed signals indicative of the motor speed from the speed sensor 515.

At block 615, the motor controller 505 determines whether the motor speed is greater than or equal to a speed threshold (e.g., a minimum speed threshold). If the motor speed is greater than or equal to the speed threshold, the motor controller 505 returns to block 605 and drives the motor 118 according to received speed commands. If the motor speed is less than the speed threshold, the motor controller 505 proceeds to block 620 and terminates operation of the motor 118. In some embodiments, terminating operation of the motor 118 includes braking the motor 118 to a complete stop. In other embodiments, the motor controller 505 allows the motor 118 to coast to a stop.

When terminating operation of the motor 118, the motor controller 505 may place the screed 100 in a locked state. In the locked state, the motor controller 505 does not act on received speed commands, leaving the motor 118 in a stationary state. In some embodiments, when the screed 100 is in the locked state, the trigger 124 is locked such that a user cannot actuate the trigger 124. Accordingly, when in the locked state, the motor 118 is non-functional.

In some embodiments, at block 615, the motor controller 505 determines whether motor speed is less than or equal to the speed threshold. If the motor speed is less than or equal to the speed threshold, the motor controller 505 proceeds to block 620 and terminates operation of the motor 118. If the motor speed is greater than the speed threshold, the motor controller 505 returns to block 605 and drives the motor 118 according to received speed commands.

In some embodiments, to allow for brief drops in motor speed, the motor controller 505 determines whether the motor speed is less than the speed threshold for a predetermined period of time. If the motor speed is less than the speed threshold for the predetermined period of time, the motor controller 505 terminates operation of the motor 118.

At block 625, the motor controller 505 receives an unlock signal (e.g., a reset signal or a restart signal) to unlock the screed 100. In some embodiments, to unlock the screed 100, a user resets or restarts (e.g., cycles) the screed 100. To restart the screed 100, a user may, for example, remove the battery pack 200, 230 or operate a power button of the screed 100. In response to the reset, the motor controller 505 allows driving of the motor 118 (at block 605). In some embodiments, the screed 100 includes an input device, such as a button, configured to unlock the screed 100. Once the screed 100 is unlocked, the motor controller 505 permits operation of the motor 118.

Figure 7:
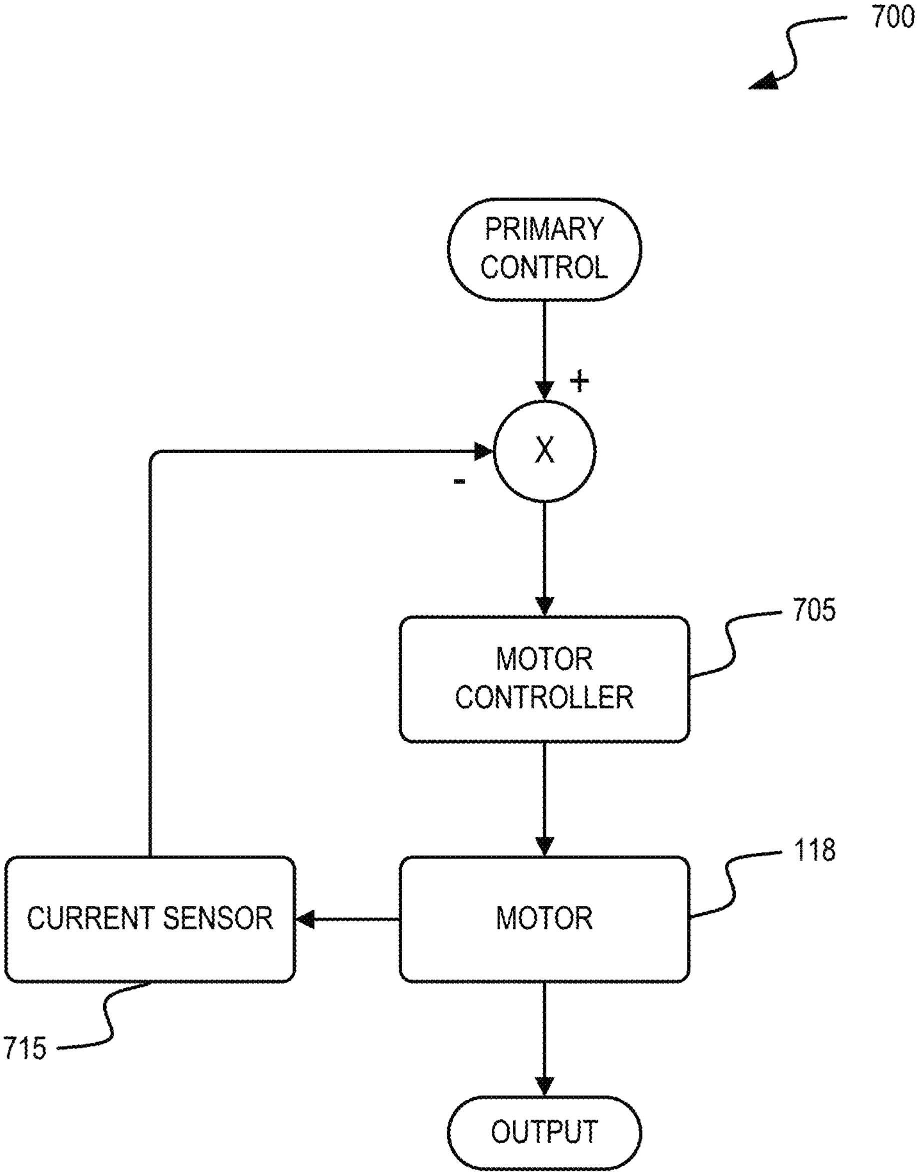
FIG. 7 illustrates a current-based motor control system for the screed of FIGS. 1A and 1B, according to embodiments described herein.

FIG. 7 illustrates a current-based motor control system 700 for the screed 100 of FIG. 1, according to embodiments described herein. Unlike conventional screeds equipped with an internal combustion engine, the screed 100 is powered by battery pack 200, 230 and implements, for example, a closed-loop motor control to regulate the motor speed to prevent the motor current and/or power draw of the screed 100 from increasing to a high and potentially damaging level. A primary control parameter is provided to a motor controller 705, such as a motor speed, a motor voltage, a pressure within the screed 100, a position or orientation of the screed 100, or the like). For example, the speed sensor 515 may provide speed signals indicative of motor speed to the motor controller 705. In another example, a voltage sensor provides voltage signals indicative of motor voltage to the motor controller 705. The primary control parameter provides feedback to the motor controller 705 as it drives the motor 118.

Additionally, the motor controller 705 uses a current sensor 715 to sense motor current and compares the sensed motor current to a current threshold value. If the motor controller 705 determines that the current is above the current threshold value, the sensed current is used as a primary control feedback loop (e.g., rather than the speed-based control in control system 500). The motor controller 705 is configured to regulate the motor speed to a lower value until the screed 100 can maintain the current loading at the threshold value. Once the motor controller 705 detects a drop (e.g., a decrease) in current below the threshold value without having to regulate the motor speed further (e.g., reduce motor speed), the motor controller 705 switches back to a normal or default primary control (i.e., speed-based control of FIGS. 5 and 6).

Figure 8:
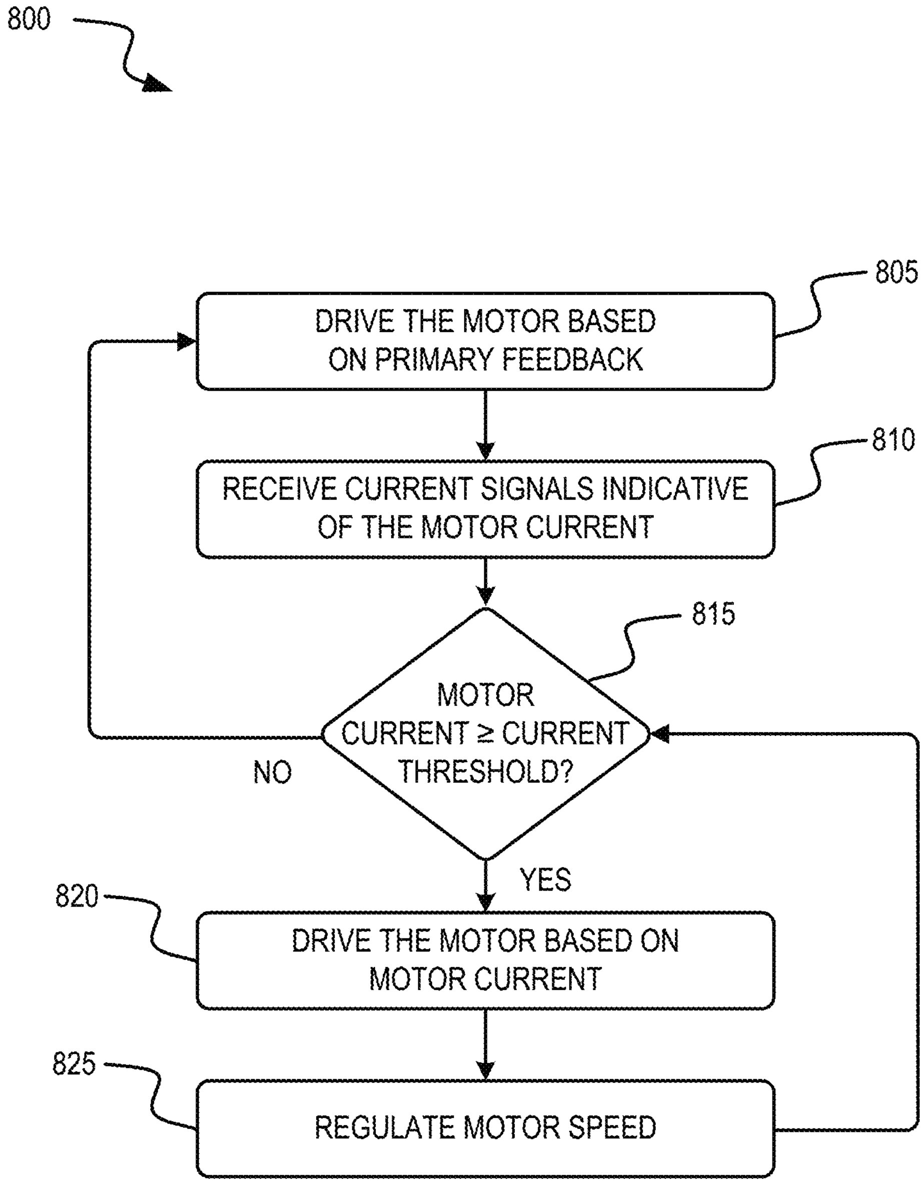
FIG. 8 illustrates a method for current-based motor control performed by the controller of FIG. 4A, according to embodiments described herein.

FIG. 8 provides a method 800 for controlling the screed 100 based on the motor current. The method 800 may be performed by the motor controller 705 (and, therefore, may be performed by the controller 400). At block 805, the motor controller 705 drives the motor 118 based on a primary feedback parameter. For example, the motor controller 705 implements a closed-loop motor control algorithm that controls the motor 118 based on, for example, motor voltage, motor speed, or some other operational parameter of the screed 100. In some embodiments, the motor controller 705 also controls the motor according to received speed commands. For example, the motor controller 705 detects actuation of the trigger 124. Upon detecting actuation of the trigger 124, the motor controller 705 provides power to the motor 118 via the inverter 465. At block 810, the motor controller 705 receives current signals indicative of the motor current from the current sensor 715.

At block 815, the motor controller 705 determines whether the motor current is greater than or equal to a current threshold. If the motor current is less than the current threshold, the motor controller 705 returns to block 805 and continues to drive the motor 118 according to received speed commands. If the motor current is greater than or equal to the current threshold, the motor controller 705 proceeds to block 820.

In some embodiments, at block 815, the motor controller 705 determines whether the motor current is greater than the current threshold. If the motor current is greater than the current threshold, the motor controller 705 proceeds to block 820. If the motor current is less than or equal to the current threshold, the motor controller 705 returns to block 805 and continues to drive the motor 118 according to received speed commands.

At block 820, the motor controller 705 drives the motor 118 based on the motor current. For example, the motor current is provided as the primary parameter for the closed-loop motor control algorithm. At block 825, the motor controller 705 regulates the motor speed. For example, the motor controller 705 limits (e.g., reduces) a maximum speed of the motor 118 while using motor current as the primary parameter for the closed-loop motor control algorithm. While regulating the motor speed, the motor controller 705 continues to monitor the motor current (at block 815). Once the motor current drops back below the current threshold, the motor controller 705 returns to block 805 and drives the motor 118 based on a primary feedback parameter. In some embodiments, should the motor current remain below the current threshold for a predetermined period of time, the motor controller 705 further reduces the maximum motor speed. Should the motor current continue to remain below the current threshold following the motor speed reduction, the motor controller 705 may brake the motor 118 or terminate operation of the motor 118.

Thus, embodiments provided herein describe, among other things, systems and methods for operating a battery pack-powered screed. Various features and advantages are set forth in the following claims.

What is claimed is:

1. A vibrating screed comprising:
- a screed member;
- a motor configured to vibrate the screed member;
- a sensor configured to output signals indicative of an operating characteristic of the motor;
- a current sensor configured to output current signals indicative of a motor current; and
- a controller connected to the sensor, the current sensor, and the motor, the controller configured to:
  - receive the signals from the sensor,
  - drive the motor based on the signals from the sensor,
  - receive the current signals from the current sensor,
  - determine whether the motor current is greater than or equal to a current threshold, and
  - drive, in response to the motor current being greater than or equal to the current threshold, the motor based on the current signals from the current sensor.

2. The vibrating screed of claim 1, wherein the sensor is a speed sensor configured to output speed signals indicative of a motor speed.

3. The vibrating screed of claim 1, wherein the sensor is a voltage sensor configured to output voltage signals indicative of a motor voltage.

4. The vibrating screed of claim 1, wherein the controller is configured to:
- determine whether the motor current has decreased below the current threshold; and
- drive, in response to the motor current decreasing below the current threshold, the motor based on the signals from the sensor.

5. The vibrating screed of claim 1, further comprising a battery pack interface configured to receive a battery pack, and wherein the battery pack is configured to provide power to the motor.

6. The vibrating screed of claim 1, wherein the controller is further configured to:
- reduce, in response to the motor current being greater than or equal to the current threshold, a maximum speed of the motor.

7. A method of operating a vibrating screed, the method comprising:
- receiving first signals from a first sensor, the first signals indicative of an operating characteristic of a motor;
- driving the motor based on the first signals from the first sensor;
- receiving current signals from a current sensor, the current signals indicative of a motor current;
- determining whether the motor current is greater than or equal to a current threshold; and
- driving, in response to the motor current being greater than or equal to the current threshold, the motor based on the current signals from the current sensor.

8. The method of claim 7, wherein the first sensor is a speed sensor configured to output speed signals indicative of a motor speed.

9. The method of claim 7, wherein the first sensor is a voltage sensor configured to output voltage signals indicative of a motor voltage.

10. The method of claim 7, further comprising:
determining whether the motor current has decreased below the current threshold; and
driving, in response to the motor current decreasing below the current threshold, the motor based on the first signals from the first sensor.

11. The method of claim 7, further comprising:
reducing, in response to the motor current being greater than or equal to the current threshold, a maximum speed of the motor.

12. The method of claim 7, wherein driving the motor includes providing, via an inverter, power from a battery pack to the motor.

* * * * *